DATA RECORDING APPARATUS

Filed Jan. 25, 1963 4 Sheets-Sheet 1

INVENTOR:
R. T. Hood, Jr.
By Keith D. Beecher
Attorney

July 13, 1965 R. T. HOOD, JR 3,195,139

DATA RECORDING APPARATUS

Filed Jan. 25, 1963 4 Sheets-Sheet 2

INVENTOR:
R. T. Hood, Jr.
By Keith D. Beecher
Attorney

INVENTOR:
R. T. Hood, Jr
By Keith D. Beecher
Attorney

INVENTOR:
R. T. Hood, Jr.
By Keith D. Beecher
Attorney

United States Patent Office 3,195,139
Patented July 13, 1965

3,195,139

DATA RECORDING APPARATUS

R. T. Hood, Jr., 4705 W. 191st St., Torrance, Calif.

Filed Jan. 25, 1963, Ser. No. 253,955
6 Claims. (Cl. 346—33)

The present invention relates to improved apparatus for recording data acquired, for example, from a utility meter or other instrumentality.

It is usual for the various utility meters which measure the domestic consumption of gas, water, and electricity at the various domiciles to be equipped with a plurality of indicator dials. These indicator dials usually each include a dial pointer and associated scale; and they indicate, on a cumulative basis, the consumption of the particular commodity or energy.

In systems in which such utility meters are used, it is usual to employ meter readers, or inspectors, who go to the various domiciles periodically to read and record the meter readings. As is well known, such readings are subject to error, and the utility companies must deal with a large volume of complaints and must continually effectuate numerous billing adjustments.

In addition, the inspector's readings must be transposed at the central station to convert them to a form suitable to be fed into the present-day electronic data processing billing machines.

The situation is created, therefore, in present-day utility data acquisition systems, in which the initial stages of acquiring data from the utility meters is slow, inefficient and subject to error; while the latter stages of billing the individual subscribers is usually effectuated by electronic data processing billing machinery, which is fast, efficient and highly precise and accurate.

It follows, therefore, that the over-all inefficiencies and limitations in the present-day systems of data acquisition in utility companies are due to the initial steps by which the data is gathered. It is also evident that the over-all efficiency of such present-day data acquisition systems could be substantially increased by the provision of some type of automatic means, or at least semi-automatic means for the initial steps of acquiring the data.

Copending application Serial No. 252,726 filed January 21, 1963 discloses and claims a system by which utility data, for example, is initially acquired and recorded in a particular binary-coded form. The recording is such that the recorded data may be directly fed into a present-day automatic electronic data processing billing apparatus, without any need to transpose or convert the data into a form acceptable to the apparatus.

In the system described in the copending application, the data acquired from the utility meters, and the like, is recorded and stored magnetically in blocks of digital binary-coded information, and this recording is such that the data may be fed directly into a usual present-day electronic data processing billing machine.

In the system described in the copending application, suitable converters are provided at each utility meter to convert the meter reading into corresponding binary-coded digital data. An appropriate converter for this purpose is described and claimed, for example, in copending application Serial No. 254,126 filed January 28, 1963.

As also mentioned in the former copending application, a semi-automatic system may be employed for the data acquisition. In the semi-automatic system the inspector actually reads the indicator dials of the utility meter, and he then actuates digit switches on his recorder to convert the meter readings into binary-coded digital data; the data being recorded by the recorder.

An object of the present invention is to provide improved recording apparatus which is especially adapted for use in the above-described type of data acquisition system.

The improved recording apparatus of the invention is constructed to record binary-coded digital data received directly from the utility meter; alternately, the recording apparatus is constructed to record data fed into the recorder by the inspector by his actuation of digit switches on the recorder in correspondence to his meter readings.

Another object of the invention is to provide such an improved recorder which, although especially adapted for use in the above-described data acquistion system, has general utility for the recording of blocks of digital data.

Yet another object of the invention is to provide such an improved recording apparatus which is light in weight and small in size so as to be readily portable, and which is constructed so that it may be conveniently plugged into an electrical receptacle associated with each binary-coded data source, such as a utility consumption-indicating meter.

A further object of the invention is to provide such an improved recording apparatus which is easy to operate and which is controllable to record binary-coded data received from an external source, such as from a binary converter associated with a utility meter, or which may be set up in the recorder itself by manually operated digit switches.

A still further object is to provide such an improved recording apparatus which is constructed to permit a selected block of received data to be automatically recorded therein in an automatically timed recording interval.

Other objects and advantages of the invention will become apparent from a consideration of the following specification when taken in conjunction with the accompanying drawings, in which.

Figure 1:
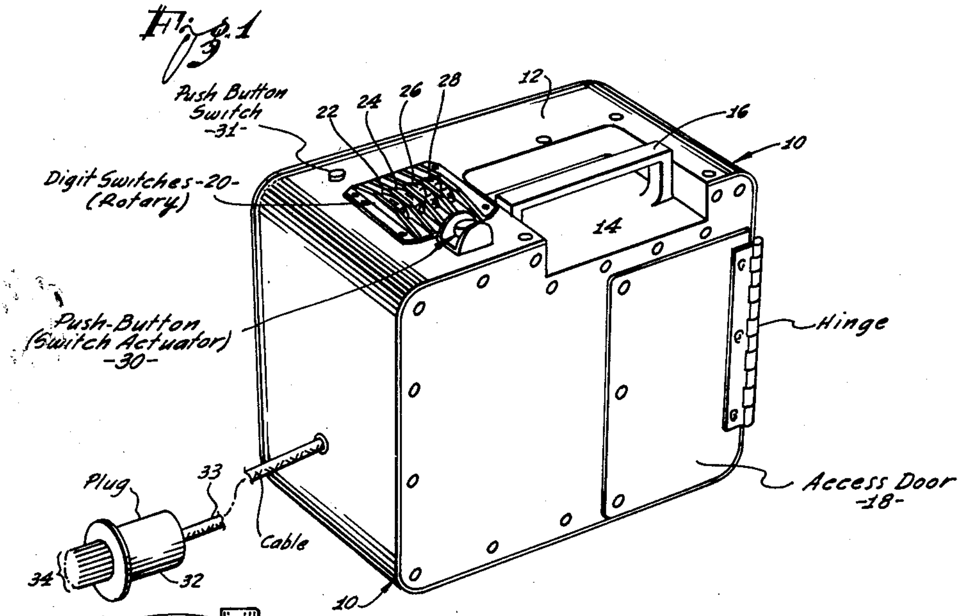
FIGURE 1 is a perspective view of a recording apparatus constructed in accordance with the concepts of the invention.

The recording apparatus of the invention, as illustrated in FIGURE 1, includes a housing 10. The housing has a generally rectangular configuration, and it includes a top 12 having a recessed portion 14 formed therein. A handle 16 is mounted in the recessed portion 14 to facilitate the carrying of the apparatus by the inspector.

The housing 10 also includes an access door 18 which is hinged to one side of the housing. The access door may be opened to reveal the components illustrated on the right hand portion of the assembly of FIGURE 2.

A plurality of digit switches 20 are mounted in the housing 10 at the right hand side of the top 12, as shown in FIGURE 1. The digit switches are used, as will be explained, for the semi-automatic operation of the apparatus. The digit switches are of the rotary type, and may include a plurality of controls 22, 24, 26 and 28, for example. Each of these controls is rotatably adjustable, and each has a dial associated with it which indicates the decimal digit to which the particular dial is set.

In the semi-automatic operation mentioned above, the inspector carries the recording apparatus of FIGURE 1 to a particular utility meter station, and he then reads the reading on the various indicator dials of the utility meter at that station. He then sets the different digit switch controls 22, 24, 26, 28 to settings corresponding to the dial readings of the meter.

The above-mentioned digit switches function in known manner, in response to their individual settings, to set up across appropriate output terminals of each switch, the binary-coded signal equivalents of the decimal settings indicated on their associated dials. These output terminals of each digit switch are connected to an electro-magnetic read head in the recording apparatus, as fully described in the copending application Serial No. 252,726, so that the binary-coded equivalents of the settings of the digit switches may be recorded on the magnetic tape in the apparatus.

The apparatus of FIGURE 1 also includes a push button switch actuator 30. As will be described in detail subsequently, the manual actuation of the switch actuator 30 activates the recorder apparatus, and such actuation causes the recorder to be activated just long enough to respond to the signals to be recorded in a corresponding block on its magnetic tape. After the required interval is completed, a timing mechanism automatically de-activates the recording apparatus. This de-activation of the recording apparatus occurs after the particular time interval; regardless of whether the switch actuator 30 is released, or whether it is held in the down position.

The apparatus of FIGURE 1 also includes a push-button switch 31. This is an "error" switch, as more fully described in copending application Serial No. 252,726. Whenever an error has been made in recording a reading, the push-button 31 is depressed and the reading is re-recorded. The previous reading is then ignored by the data processing equipment at the central station.

The recording apparatus of FIGURE 1 also includes an electric plug 32 which is connected to the recorder by a cable 33. The plug 32 has a group of contact pins 34 which are intended to engage a mating receptacle at each of the meter stations whose data is to be acquired by the apparatus.

In the fully automatic system, the inspector merely plugs in his plug 32 with the corresponding receptacle at each meter station, and then depresses the switch actuator 30. The recording apparatus then automatically records the data from the particular meter station, and turns itself off after the data has been recorded.

As more fully described in the copending application Serial No. 252,726, the data from each meter station includes information concerning the actual meter readings, as well as further information identifying the meter, and specifying the rate and area code, if necessary. All this data, as described in the copending application, is converted to binary-coded form, so that it may be recorded on the magnetic tape in the apparatus in a form appropriate to be directly read into an automatic data processing billing machine at the central station.

Figure 2:
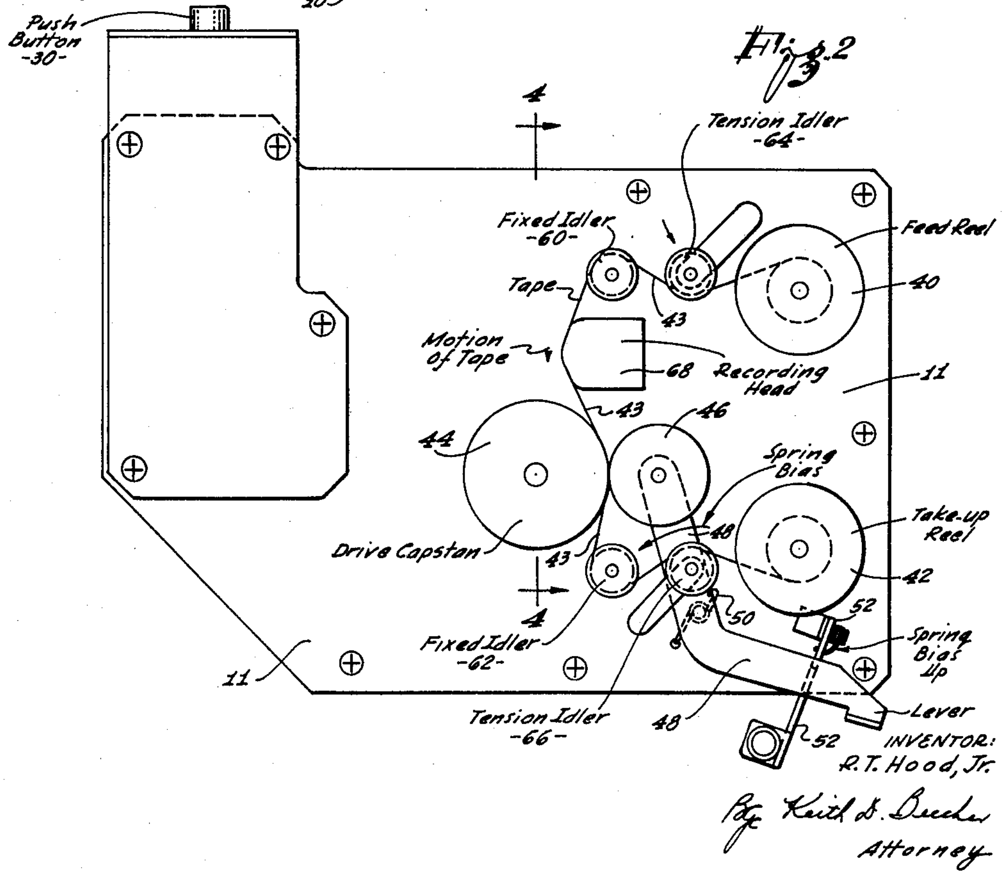
FIGURE 2 is a side view of the recording apparatus of FIGURE 1, with a portion of the apparatus removed to reveal the internal operating components.

As best shown in FIGURE 2, the recording apparatus of FIGURE 1 includes a feed reel 40 and a take-up reel 42. A magnetic recording tape 43 of any appropriate known composition is drawn from the feed reel along a particular path and is taken up on the take-up reel 42.

The magnetic recording tape 43 is drawn along the particular path by a drive capstan 44. An idler puck 46 is rotatably mounted on the end of a lever arm 48, the puck being disposed on the opposite side of the path of the magnetic tape from the drive capstan 44.

The lever arm 48 is biased in a counter-clockwise direction by a coil spring 50, so that the idler puck 46 is normally biased against the drive capstan 44. This causes the magnetic recording tape 43 to be squeezed between the drive capstan 44 and the idler puck 46. The drive capstan 44 is rotatably driven, as will be described, to draw the tape 43 along the particular path from the feed reel 40 to the take-up reel 42.

A latch 52 is mounted on an upper deck 11, of the housing 10. This deck is usually referred to as the upper "tape" deck. The latch is normally biased in a direction such that its end tends to move up from the plane of the paper in FIGURE 2.

The lever arm 48 may be manually turned in a clockwise direction against the tension of the spring 50, and when so turned, the latch 52, which is also spring-biased, engages a groove (not shown) in the under side of the lever. This enables the latch 52 to hold the lever arm 48 in a position such that the idler puck 46 is displaced from the drive capstan 44.

When the idler puck is in the disengaged position, the tape 43 may be removed from the mechanism, and a new tape may be inserted in its place. When the new tape is inserted, the end of the latch 52 is pushed down, so as to release the lever arm 48. This enables the spring 50 again to bias the idler puck 46 against the drive capstan 44.

Usual fixed rotatable idlers 60 and 62 are positioned to be engaged by the magnetic recording tape 43, as shown in FIGURE 2. The assembly also includes usual tension idlers 64 and 66 which provide a desired degree of tension on the tape. An electro-magnetic record head 68 is positioned to be magnetically coupled to the tape 43, as the tape is drawn from the idler 60 to the drive capstan 44. The electro-magnetic recording head 68, as described more particularly in the copending application Serial No. 252,726 is of a multiple type. That is, the recording head 68 includes a plurality of separate recording sections, and each section serves to respond to different digital binary coded input signals to provide corresponding recordings on different adjacent channels on the magnetic recording tape 43.

Figure 3:
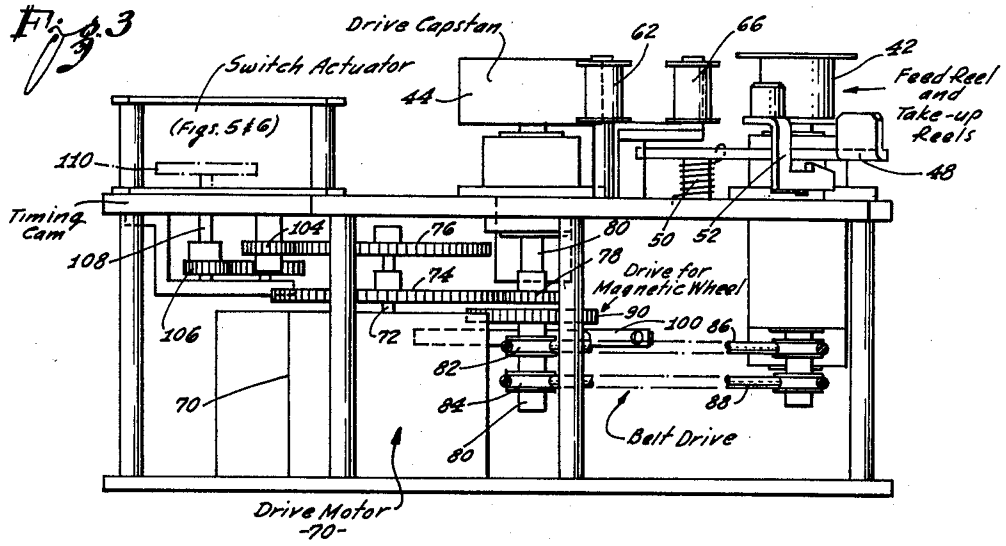
FIGURE 3 is an elevational view of the recording apparatus revealing further internal operating components of the apparatus.

As best shown in FIGURE 3, the recording apparatus assembly includes a usual drive motor 70 which is energized by an appropriate battery (not shown). The drive motor 70 includes a drive shaft 72 which is coupled to a pair of coaxial spur gears 74 and 76. The gear 74 is meshed with a further gear 78 which is mounted on a shaft 80 which, in turn, supports the drive capstan 44.

A pair of pulleys 82 and 84 are also mounted on the shaft 80, and these pulleys drive the feed reel 40 and take-up reel 42 through appropriate belt drives 86 and 88.

Figure 4:
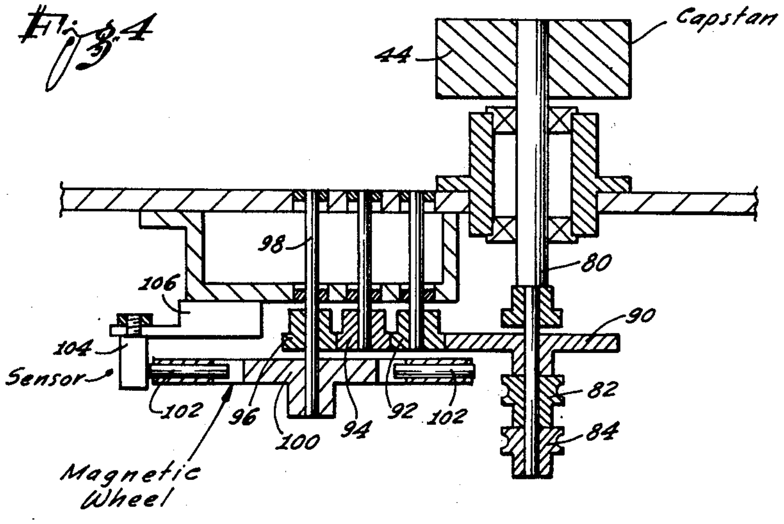
FIGURE 4 is a sectional view, substantially on the line 4—4 of FIGURE 2, and illustrating particularly the magnetic synchronizing wheel included within the recording apparatus.

A further gear 90 is mounted on the shaft 80, and this further gear meshes with an idler gear 92 (FIGURE 4). The idler gear 92 is coupled through a further idler 94 to a gear 96. The gear 96 is mounted on a shaft 98, and it serves to drive a magnetic wheel 100 which, likewise, is mounted on the shaft 98.

The magnetic wheel 100 has a plurality of permanent magnets 102 disposed at equiangular positions about its periphery. An electro-magnetic sensor 104 is mounted on a bracket 106 in magnetically coupled relationship with the permanent magnets 102 on the wheel 100. The sensor 104 serves to produce electrical pulses corresponding to the angular movement of the magnetic wheel 100. These pulses, as fully described in the copending application Serial No. 252,726, are used as clock pulses for timing in the system.

The gear 76 engages a further gear 104. The gear 104 is coupled through a plurality of reduction gears to a gear 106 on a shaft 108 (FIGURE 3).

Figure 5:
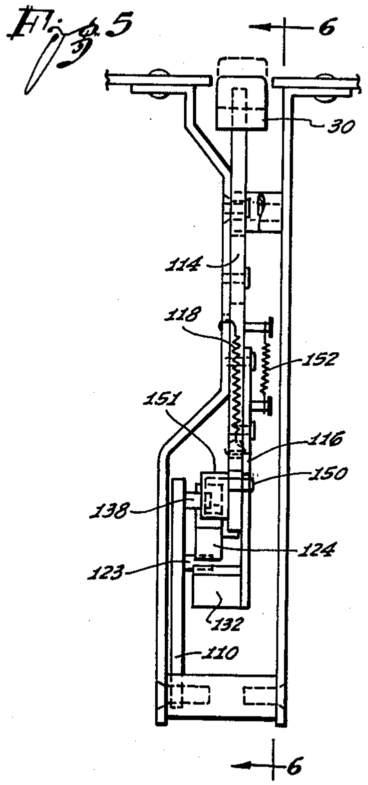
FIGURES 5 and 6 are front and side views of a switching control assembly included in the apparatus.
Figure 6:
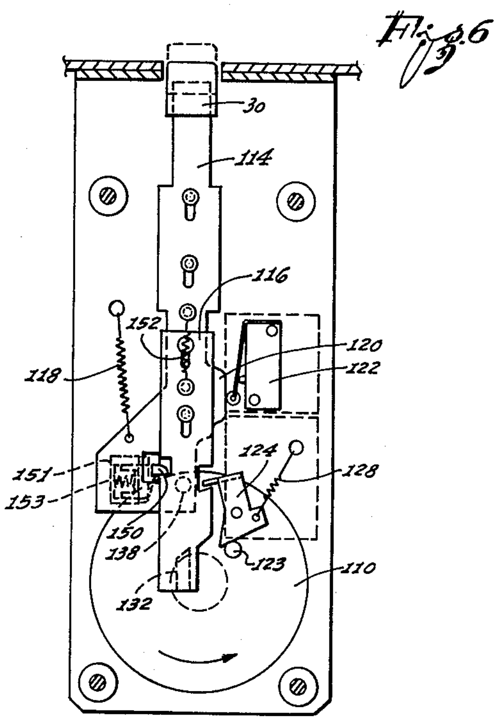
Figure 7:
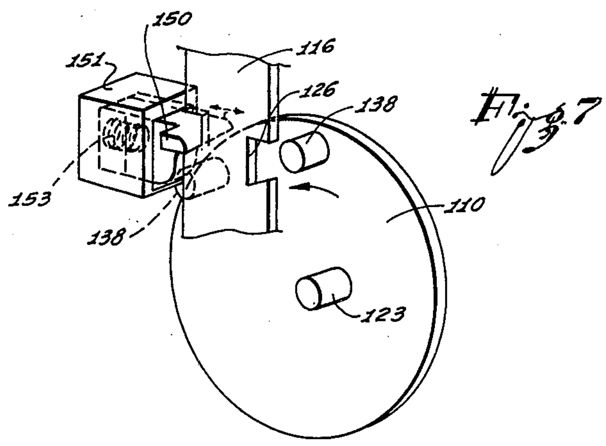
FIGURE 7 is a fragmentary view of the switching assembly of FIGURES 5 and 6.

A disc-like member 110 is mounted on the shaft 108 (FIGURES 5 and 6).

The assembly illustrated in FIGURES 5 and 6 is the switch actuator assembly referred to above. This assembly is actuated by the push-button 30. When the push-button actuator 30 is depressed, a pair of strip members 114 and 116 are moved downwardly against the tension of a spring 118. This causes a switch actuating cam 120 to actuate a limit switch 122.

The limit switch 122 energizes the drive motor 70 of

FIGURE 3, and also it activates the electrical circuitry of the recorder. This actuation is such that when the push-button 30 is depressed, the recorder is put into operation, so that the data referred to above may be recorded on the tape 43.

The recording apparatus remains in operation, until a pin 123 on the disc 110 engages a latch 124 and moves the latch out of a notch 126 in the side of the member 116. The latch 124 is spring loaded by a spring 128, so that the latch engages the notch 126, when the members 114 and 116 are moved downwardly by the push-button actuator 30.

The arrangement described above is such that when the push-button actuator 30 is depressed and released, the latch 124 engages the notch 126 and holds the assembly in a down position until the latch is released. When the assembly is moved to the down position, the limit switch 122 is operated from its stand-by position to its activating condition, to energize the drive motor 70. However, when the latch 124 is released, the assembly returns to its upper position, and the cam 120 returns the limit switch to its stand-by condition, and the drive motor is de-energized.

This return of the assembly to the stand-by condition occurs after a time interval, during which the pin 123 describes a complete circle and engages the latch 124. Under normal circumstances, the pin 123 engages a stop 132 extending from the member 116. This prevents the disc 110 from rotating. However, when the push-button 30 is depressed, the limit switch 122 is actuated and the pin 123 is released by the stop 132. The limit switch 122 energizes the drive motor 70 and causes the disc 110 to describe a complete revolution.

A second pin 138 is also mounted on the disc 110, and when the disc is rotated, the pin 138 makes a complete revolution with the pin 123. If during the course of the revolution of the disc 110, the push-button 30 is released, then the strips 114 and 116 are returned to their upper position upon the release of the latch 124 by the pin 123 at the completion of the revolution.

However, should the person actuating the assembly hold the push-button actuator 30 depressed for an interval longer than that required for the disc 110 and the pin 123 to describe a complete revolution, the release of the latch 124 by the pin has no effect in returning the assembly to its upper position.

However, when this occurs, the pin 138 is free to move against a spring loaded latch 150. The latch 150 is mounted in a block 151 which, in turn, is mounted on the strip 114. The latch is spring biased in the block 151 by means of a coil spring 153.

The actuation of the latch 151 by the pin 138 withdraws the latch 150 from a notch in the edge of the strip 116. This withdrawal of the latch 150 permits a spring 152 to draw the strip members 114 and 116 into a telescoped relationship. The cam 120 is thereby moved up and the limit switch 122 returns to its stand-by condition and de-energizes the drive motor 70.

The operation of the disc 110 and its associated elements is shown in FIGURES 8A–8L.

Figures 8A, 8B, 8C, 8D, 8E, 8F, 8G, 8H, 8I, 8J, 8K, 8L:
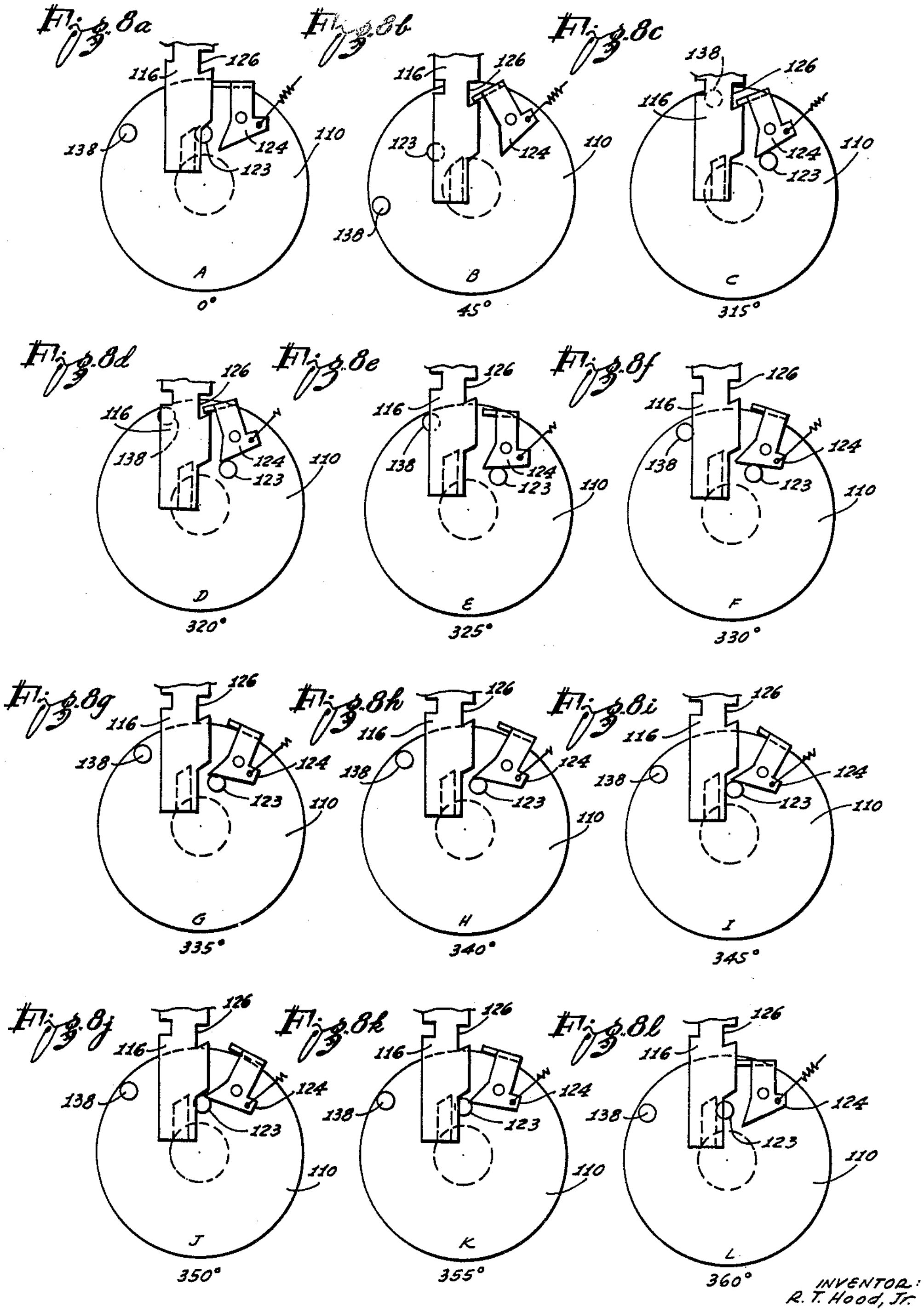
FIGURES 8A–8L are functional representations of certain of the components of the switching assembly.

In FIGURE 8A, the assembly is in its usual stand-by condition in which the pin 123 bears against the stop 132, the drive motor 70 de-energized, and the latch 124 bears against the side of the strip 116.

When the push-button is depressed, the strips 114 and 116 are moved down to the position of FIGURE 8B, the drive motor 70 is energized to rotate the disc 110 at the predetermined speed, and the pin 123 is released by the stop 132. The latch 124 now engages the notch 126 to hold the strips 114 and 116 in their down position.

The pin 123 now describes its circle in the timed interval and turns to the position of FIGURE 8C. In this latter position, it engages the latch 124. Upon subsequent rotation of the disc 110 (FIGURES 8D and 8F), the pin 123 causes the latch 124 to be removed from the notch 126. This releases the strip 116, and if the pressure has been removed from the push-button 30, the assembly deenergizes the drive motor 70 and returns to its stand-by position (FIGURES 8G–8L).

In the event that the pressure is not removed from the push-button 30, the pin 138 actuates the latch 150, as described above. This causes the strips 114 and 116 to telescope, as described above; which causes the strip 116 to move upwardly, just as if the push-button 30 had been released. When the push-button 30 is finally released, the strips 114 and 116 move outwardly with respect to one another and the latch 150 again engages.

Therefore, the assembly of FIGURES 5 and 6 permits the limit switch 122 to be turned off after a predetermined interval, and this turning off of the limit switch occurs under conditions where the person actuating the assembly immediately releases the push-button 30, or when the person actuating the assembly holds the push-button down. For the latter condition, the subsequent release of the push-button returns the assembly to the condition shown in FIGURE 6. That is, the strips 114 and 116 are again drawn to their extended position and latched against the tension of the spring 152.

Therefore, the assembly of FIGURES 5 and 6 permits a simple control of the recording apparatus to be effectuated. That control is such that the recorder is actuated only for the interval required to record a block of data. This interval is established merely by depressing the push-button actuator 30. Then, if the push-button is immediately released, or if it is held down, the same situation obtains. That is, the recorder remains energized for an interval long enough to record the block of data, and then it turns itself off.

The invention provides, therefore, improved recording apparatus for use in data acquisition systems. The improved apparatus of the invention is relatively simple and straightforward in its construction. Moreover, the improved recording apparatus is readily portable, and it may be conveniently carried to the position and station at which the data is to be acquired. Thus, the acquisition of the data by the recording apparatus of the invention is conveniently effectuated, merely by depressing a single control switch.

As mentioned above, the recording apparatus is carried from station to station, and, in each instance, a block of data in binary-coded form is recorded on the magnetic tape in the apparatus. Each block of data not only identifies the particular meter station, but also can contain a rate and area code. Also, the block contains binary-coded information representing the actual meter reading.

As mentioned above, the meter reading may be acquired automatically through an appropriate converter on the meter itself, as described in the copending application Serial No. 254,126. Alternately, the meter reading can be read by the inspector, and the binary-coded data corresponding to the reading can then be set by him in the recording apparatus by the manipulation of the above described digit switches.

While a particular embodiment of the invention has been shown and described, modifications may be made, and it is intended in the claims to cover such modifications which fall within the spirit and scope of the invention.

What is claimed is:

1. A portable recording apparatus including: a housing; drive means mounted in said housing for drawing a magnetic recording medium along a predetermined path; an electro-magnetic recording head mounted in said housing in position to be magnetically coupled to said magnetic recording medium; means for introducing binary-coded data to said electro-magnetic recording head to be recorded on said magnetic recording medium; switching means for causing said drive means to be activated; manually operated means for actuating said switching means from a stand-by position to an activating position; means for returning said switching means to its stand-by position after a predetermined movement of said drive means; a synchronizing wheel rotatably mounted in said housing; means mechanically coupling said wheel to said drive means to cause said wheel to be driven by said drive means; and means coupled to said wheel for producing electrical pulses indicative of the angular movement of said wheel.

2. A portable recording apparatus including: a housing; drive means mounted in said housing for drawing a magnetic recording medium along a predetermined path; an electro-magnetic recording head mounted in said housing in position to be magnetically coupled to said magnetic recording medium; an electric plug assembly coupled to said housing and adapted to be plugged into a corresponding receptacle so as to introduce binary-coded data to said electro-magnetic recording head to be recorded on said magnetic recording medium; switching means for causing said drive means to be activated; manually operated means for actuating said switching means from a stand-by position to an activating position; means for returning said switching means to its stand-by position after a predetermined movement of said drive means; a synchronizing wheel rotatably mounted in said housing; means coupling said wheel to said drive means to cause said wheel to be driven by said drive means; and means coupled to said synchronizing wheel for producing electrical pulses indicative of the angular movement of said wheel.

3. A portable recording apparatus including: a housing; drive means mounted in said housing for drawing a magnetic recording medium along a predetermined path; an electro-magnetic recording head mounted in said housing in position to be magnetically coupled to said magnetic recording medium; an electric plug assembly mounted on said housing and adapted to be plugged into a corresponding receptacle so as to introduce binary-coded data to said electro-magnetic recording head to be recorded on said magnetic recording medium; switching means for causing said drive means to be activated; manually operated means for actuating said switching means from a stand-by position to an activating position, said manually operated means including a spring-biased assembly mounted for rectilinear sliding movement and having a notch formed therein, a switch operating means mounted on said spring-biased assembly in position to operate said switching means when said spring-biased assembly is moved from a first to a second position, and a spring-biased latching member mounted in said housing in position to engage said notch when said spring-biased assembly is in said second position; and timing means for returning said switching means to its stand-by position a predetermined time interval after the actuation thereof by said manually operated means, said timing means including a rotatable member coupled to said drive means, means mounted on said last-named rotatable member in position to engage and release said latching member from said notch a predetermined time interval after the movement of said spring-biased assembly to said second position.

4. The portable recording apparatus of claim 3 in which said spring-biased assembly includes two strip members mounted in axial alignment with one another, spring means for biasing said strip members into a telescoped relationship, and a further latching member for maintaining said two strip members in an extended relationship against the force of said spring means; and in which said timing means includes further means for engaging and releasing said further latching member upon said assembly remaining in said second position after said last-mentioned predetermined time interval.

5. In a recording apparatus, the combination of: drive means for drawing a recording medium along a predetermined path; switching means for causing said drive means to be activated; manually operated means for actuating said switching means from a stand-by position to an activating position, said manually operated means including a spring-biased assembly mounted for rectilinear sliding movement and having a notch formed therein, a switch operating member mounted on said spring-biased assembly in position to operate said switching means upon movement of said spring-biased assembly from a first to a second position, and a spring-biased latching member mounted in said housing in position to engage said notch in said spring-biased assembly when said assembly is in said second position; and timing means for returning said switching means to its stand-by position a predetermined time interval after the actuation thereof by said manually operated means, said timing means including a rotatable member coupled to said drive means, and means mounted on said rotatable member in position to engage and release said latching member from said notch a predetermined time interval after said spring-biased assembly is moved to said second position.

6. The combination defined in claim 5 in which said spring-biased assembly includes two strip members mounted in axial alignment with one another, spring means for biasing said strip members into a telescoped relationship, and a further latching member for maintaining said two strip members in an extended relationship against the force of said spring means; and in which said timing means includes further means for engaging and releasing said further latching member upon the spring-biased assembly remaining in said second position after said last-mentioned predetermined time interval.

References Cited by the Examiner

UNITED STATES PATENTS

| | | | |
|---|---|---|---|
| 2,819,939 | 1/58 | Dull | 200—33 X |
| 2,988,415 | 6/61 | Jeglum et al. | 346—33 |
| 3,025,365 | 3/62 | Goodhouse et al. | 200—33.2 |
| 3,103,401 | 9/63 | Daniels et al. | 346—33 X |

LEO SMILOW, *Primary Examiner.*